June 14, 1960

W. E. SPRINGER ET AL 2,941,133

AUTOMATIC SPEED-VARYING CONTROL

Filed Sept. 23, 1954

INVENTOR.
WILLIAM E. SPRINGER AND
JOHN S. MICHIE.
BY
Harold B. Hood
ATTORNEY.

June 14, 1960 W. E. SPRINGER ET AL 2,941,133
AUTOMATIC SPEED-VARYING CONTROL
Filed Sept. 23, 1954 3 Sheets-Sheet 2

INVENTORS
WILLIAM E. SPRINGER AND
JOHN S. MICHIE.
BY Harold B. Hood.
ATTORNEY.

United States Patent Office 2,941,133
Patented June 14, 1960

2,941,133

AUTOMATIC SPEED-VARYING CONTROL

William E. Springer and John S. Michie, Columbus, Ind., assignors, by mesne assignments, to The Reliance Electric and Engineering Company, Cleveland, Ohio, a corporation of Ohio Filed Sept. 23, 1954, Ser. No. 457,880

4 Claims. (Cl. 318—11)

The present invention relates to an automatic control primarily intended to dominate a speed varying mechanism to provide automatic control for such mechanism. The invention finds its primary utility in connection with a variable speed drive for a spinning frame; and we have illustrated and shall describe two embodiments of the control, respectively adapted for use with the two major types of spinning frames conventionally in use.

A primary object of the invention is to provide a control which, when manually set into operation, will thereafter automatically drive the shiftable element of a speed varying device continuously to vary the output speed of that device in one direction until a predetermined setting is attained, whereupon the variation will be automatically stopped.

As to one form of the invention, it is a further object to provide means whereby the speed varying mechanism will be held in such predetermined setting for a predetermined period whereafter the control will be automatically energized to vary the output speed of the drive in the opposite direction until a different predetermined setting is reached, whereupon the speed variation will again be stopped.

Further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
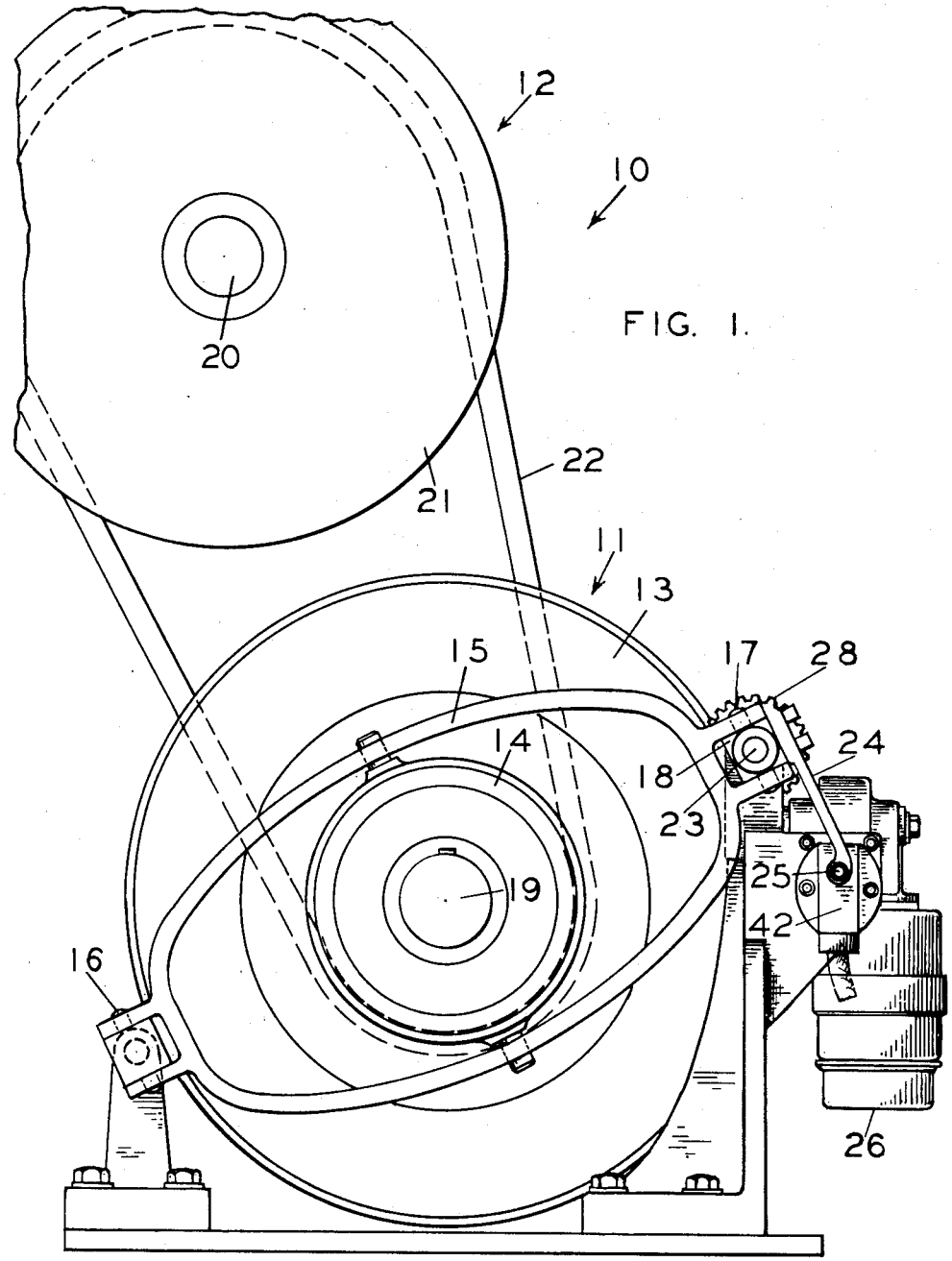
Fig. 1 is a more or less diagrammatic illustration of a variable speed drive means with which our control is associated.

Referring more particularly to the drawings, in Fig. 1 I have shown one conventional form of variable speed drive means, indicated generally by the reference numeral 10, and which may be generally of the character illustrated in the patent to J. S. Michie No. 2,571,920, issued October 16, 1951. As shown, such drive means may comprise an expansible V-pulley 11 and a cooperating expansible V-pulley 12. In the form of drive suggested, the pulley 11 comprises a shiftable coned disc 13 mounted for mating association with a fixed coned disc (not shown) and having operatively associated therewith a thrust bearing whose housing 14 is engaged, at diametrically opposite points, by a yoke 15 pivotally mounted at one end, as at 16, and at its opposite end engaging oppositely projecting trunnions 17 fixed to a nut 18. The pulley 11 is mounted on a shaft 19 which may be an input shaft, while the pulley 12 is mounted upon a parallel shaft 20 which may be an output shaft or the main shaft of a machine to be driven through the unit 10; and the pulley 12 comprises a fixed coned disc 21 and a mating, axially-shiftable disc (not shown) which may preferably be spring pressed toward the disc 21. A belt 22 provides a driving connection between the pulleys 11 and 12 in a manner which is well known in the art. Obviously, with the pulley 11 expanded, as suggested in Fig. 1, the pulley 12 will be driven at a peripheral speed less than that of the pulley 11; but, as the disc 13 is moved toward its mate, the belt 22 will be squeezed outwardly between the discs of the pulley 11 and will be drawn more deeply between the discs of the pulley 12, forcing the spring-pressed disc of the pulley 12 away from the disc 21, to increase the peripheral speed of the pulley 12.

Figure 2:
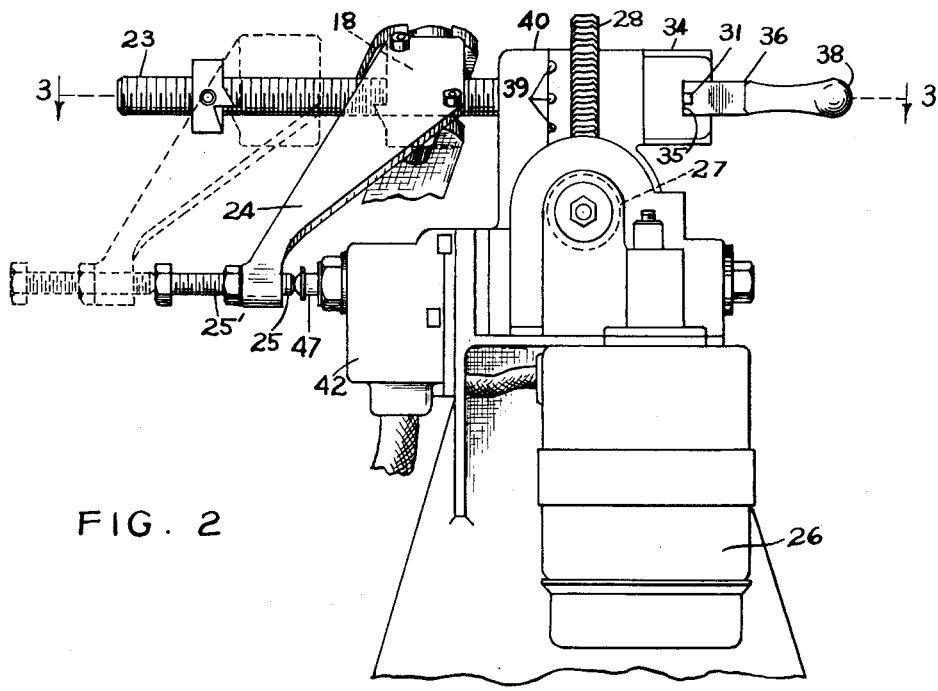
Fig. 2 is a side elevation of one form of our control device.
Figure 3:
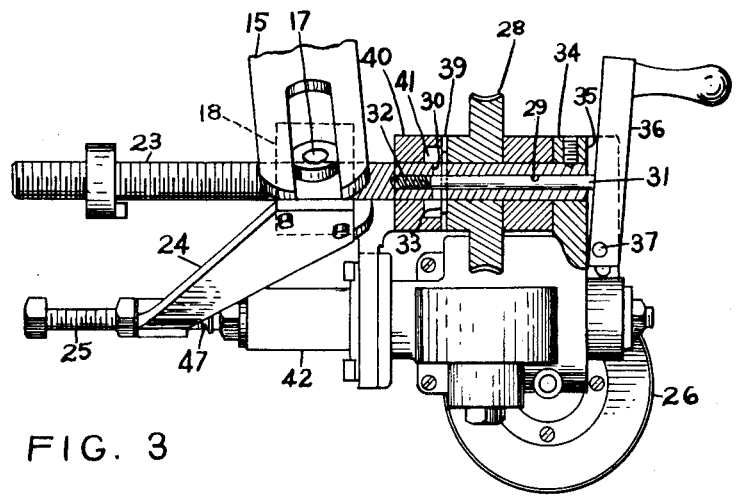
Fig. 3 is a horizontal section taken substantially on the line 3—3 of Fig. 2.

The nut 18 is threadedly mounted on a screw shaft 23 so that, as the shaft 23 is rotated in one direction or the other, the nut 18 will be caused to move, longitudinally of the shaft 23, in one direction or the other to shift the disc 13 of the pulley 11 toward or away from its mate; and the parts are so arranged that, upon counter-clockwise rotation of the shaft 23, as viewed in Fig. 1, the nut 18 will be shifted toward the right, as viewed in Figs. 2 and 3, to increase the output speed of the unit 10.

An arm or finger 24 is suitably supported upon the nut 18 to move therewith; and, at its free end, said finger 24 preferably carries an adjustable abutment 25 which, in the illustrated embodiment of the invention, comprises a screw threadedly penetrating a bore in the finger 24 formed on an axis parallel with the axis of the shaft 23, together with a stop nut 25' threadedly mounted on said screw and cooperable with the finger 24 to retain said screw in any selected position of adjustment.

An electric motor 26 is connected to drive a worm 27 which meshes with a worm wheel 28 journalled on the screw shaft 23 (see Fig. 3). An axial socket 29 is formed in one end of the screw shaft 23, and an axially-elongated, transverse bore 30 traverses said socket near its inner end. A plunger 31 is reciprocably mounted in the socket 29, and a coiled spring 32 is received in the inner end of said socket, bearing against the plunger to urge the same resiliently outwardly. A pin 33 penetrates the plunger 31 adjacent its inner end, and extends outwardly through the bore 30 to limit reciprocation of the plunger 31.

A collar 34 is fixed to the outer end of the screw shaft 23, as by means of a set screw or other suitable means; and said collar is formed, at its outer end, with a traverse slot 35 in which is engaged a lever 36 pivotally mounted, as at 37, for oscillation about an axis which is offset from, and transverse with respect to, the axis of the screw shaft 23, said lever preferably being provided with a handle 38 for facilitating manual manipulation thereof.

The inner face of the worm wheel 28 is provided preferably with a plurality of radially extending sockets 39 in any one of which the pin 33 may be engaged to provide a driving connection between the worm wheel and the shaft 23; and it will be noted that the spring 32 urges said pin 33 resiliently toward engagement in one of said sockets 39.

A bearing portion 40 of the control frame is formed with a cylindrical cavity 41 into which the pin 33 may be moved, against the tendency of the spring 32, by shifting the lever 36 in a counter-clockwise direction from its illustrated position in Fig. 3. When the pin is so moved into the cavity 41, it will be seen that the shaft 23 will thereby be declutched from the worm wheel 28, so that the shaft may be rotated, by manipulation of the handle 38, without affecting the worm wheel 28 and the train whereby said worm wheel is normally connected to the motor 26.

Figure 4:
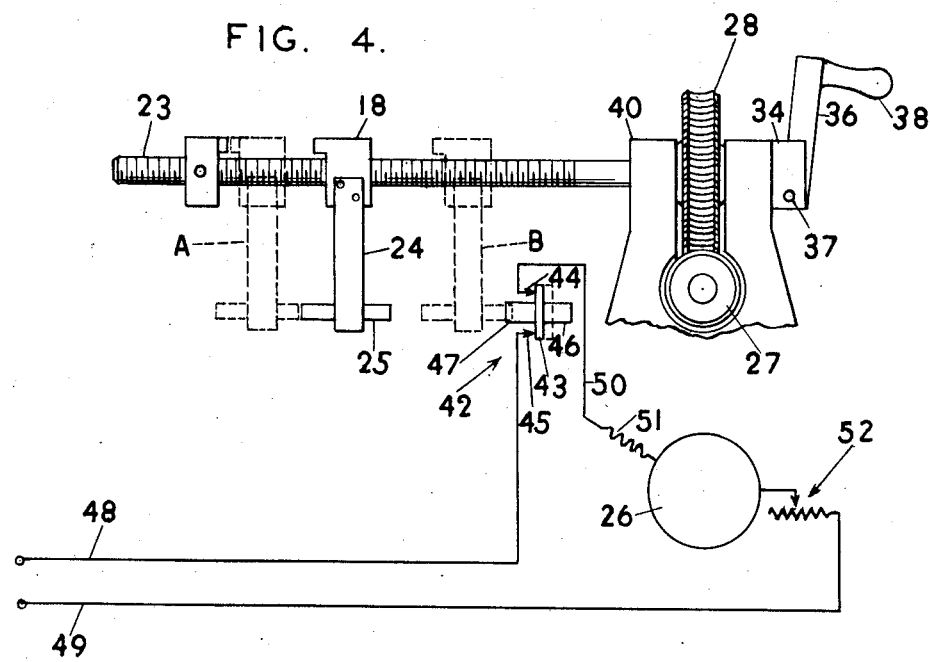
Fig. 4 is a diagrammatic illustration of one form of our control.
Figure 5:
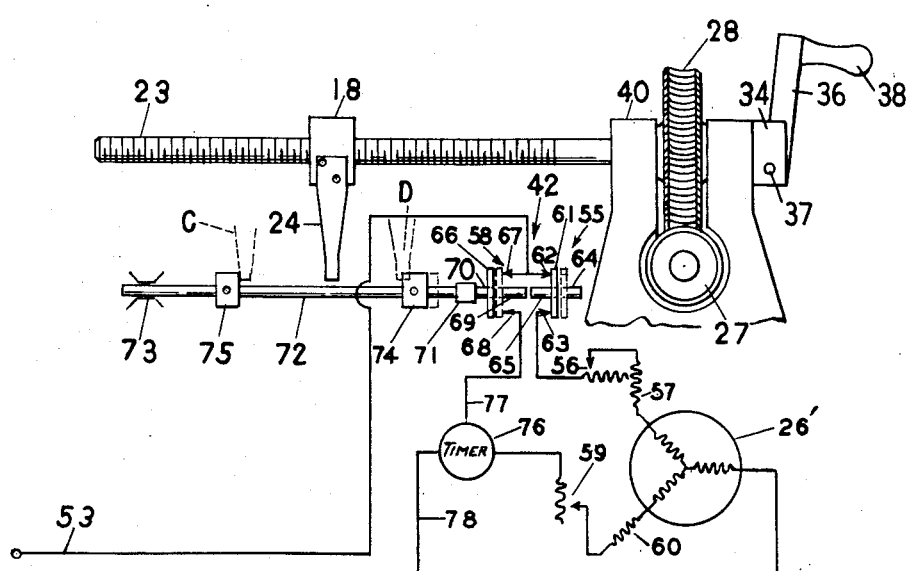
Fig. 5 is a similar illustration of another form thereof.

A switch mechanism is indicated generally at 42; and this mechanism may take the form illustrated in Fig. 4 or, alternatively, it may take the form illustrated in Fig. 5.

As shown in Fig. 4, the switch mechanism 42 comprises a bridge piece 43 adapted, in one position, to provide electrical contact between terminals 44 and 45. According to the illustrated embodiment of the invention, the bridge piece 43 will be a part of a conventional snap-action, push type switch with double extensions 46 and 47. As is well understood in the art, the bridge piece of such a switch will remain in either of two limiting positions until it is positively shifted to its other position; and such a switch is often referred to as an "on-off" switch. The extension 47 is positioned for engagement by the abutment 25, in one position of the arm 24, while the extension 46 is mounted for manual manipulation.

The terminals 44 and 45 are connected in the energizing circuit for the motor 26. Thus, the line wire 48 leads to the terminal 45, while a wire 50 connects the terminal 44 with the energizing winding 51 of the motor 26, while the wire 49 is connected, preferably through a rheostat 52, to complete the motor energizing circuit.

Now it will be apparent that, with the arm 24 in position A of Fig. 4, if the extension 46 of the switch mechanism 42 is pressed to move the bridge piece 43 to its solid line position, the motor 26 will be energized to drive the worm wheel 28 in a direction to rotate the shaft 23 in a counter-clockwise direction as viewed in Fig. 1. As a result, the nut 18 will travel toward the right as viewed in Fig. 4, thereby shifting the pulley disc 13 to increase the output speed of the unit 10. As the arm 24 reaches position B of Fig. 4, the abutment 25 will engage the switch extension 47 and will shift the bridge piece 43 to its dotted line position of Fig. 4, thereby breaking the energizing circuit for the motor 26.

To return the parts to starting position, the lever 36 will be shifted in a counter-clockwise direction to move the plunger 31 against the tendency of the spring 32 to disengage the pin 33 from the socket 39 and to move the same into the cavity 41. Thereupon, the handle 38 will be turned in a counter-clockwise direction, as viewed from the right of Fig. 4, whereby the nut 18 will be returned to position A.

In Fig. 5, we have illustrated a modified arrangement. In this form of the control, the line wires 53 and 54 are connected through a first switch 55, a rheostat 56 and the forward winding 57 of a reversible electric motor 26'; and, in parallel, through a second switch 58, a rheostat 59 and the reverse winding 60 of said motor. The first switch 55 comprises a bridge piece 61 adapted to bridge the terminals 62 and 63, said switch being a snap-action "off-on" switch with double extensions 64 and 65. The second switch 58 comprises a bridge piece 66 adapted to bridge terminals 67 and 68, and is the same type of switch with double extensions 69 and 70. The two switches are mounted in cooperating relation, with their extensions 65 and 69 so associated that neither switch can remain in "on" position when the other switch is moved to "on" position. That is, if the bridge piece 61 is in its solid line position, movement of the bridge piece 66 to its dotted line position will cause the extension 69 to engage the extension 65 to shift the bridge piece 61 to its dotted line position. The extension 64 of the switch 55 is exposed for manual manipulation, while the extension 70 of the switch 58 is connected, through a two-way coupling 71, to a rod 72 mounted in suitable bearings, suggested at 73, for reciprocation upon an axial path parallel with the axis of the shaft 23. Stops 74 and 75 are adjustably mounted on the rod 72 for alternative engagement by the arm or finger 24.

When the finger 24 is located at any point between the stops 74 and 75, if the extension 64 is pressed to move the bridge piece 61 into its solid line position, the motor 26' will be energized, through a circuit leading from wire 53 through terminal 62, bridge piece 61, terminal 63, rheostat 56, winding 57 and wire 54, to drive the shaft 23 in a clockwise direction as viewed from the right of Fig. 5 to move the nut 18 and finger 24 toward the right. When the finger 24 reaches position D of Fig. 5, it will, by engagement with the stop 74, shift the rod 72 to the right, thereby moving the bridge piece 66 from its solid line position to its dotted line position. During such movement, the extension 69 engages the extension 65 to shift the bridge piece 61 to its dotted line position, thereby deenergizing the forward winding 57 of the motor 26'.

In its dotted line position, the bridge piece 66 bridges the terminals 67 and 68 to establish an energizing circuit through a timer 76, said circuit leading from wire 53 through terminal 67, bridge piece 66, terminal 68, wire 77, timer 76, and wire 78 to wire 54. The timer 76, which may take any well known form, is operable, when so energized, to close a further switch, embodied in said timer, after a predetermined time, said further switch being connected in series with the reverse winding 60 of the motor 26'. Thus, a predetermined time after energization of the timer 76, said further switch will be automatically closed to energize the reverse winding 60 of the motor 26' to drive the worm wheel 28 in the opposite direction to cause movement of the nut 18 from position D toward the left. When the finger 24 engages stop 75, at position C, the rod 72 will be shifted toward the left, thereby returning the bridge piece 66 from its dotted line position to its solid line position to open the timer circuit and the reverse energizing circuit of the motor 26'. Thus the control is brought to rest, and its cycle will not be restarted until the switch 55 is manually manipulated to shift the bridge piece 61 into its solid line position.

We claim:

1. The combination with variable-speed drive means including an element shiftable oppositely to vary oppositely the output speed of said drive means, of control means therefor comprising a reversible electric motor, means connecting said motor to shift said element oppositely, a forward energizing circuit for said motor, a first switch in said circuit, a reverse energizing circuit for said motor, a second switch in said reverse circuit, a third switch, normally open, in series with said second switch in said reverse circuit, a member mounted for movement in opposite directions, means connecting said motor to drive said member in one direction, upon energization of said forward circuit, to open said first switch and close said second switch, and delayed-action means energized upon closure of said second switch, to close said third switch after a predetermined interval.

2. The combination with variable-speed drive means including an element shiftable oppositely to vary oppositely the output speed of said drive means, of control means therefor comprising a reversible electric motor, means connecting said motor to shift said element oppositely, a forward energizing circuit for said motor, a first switch in said circuit, a reverse energizing circuit for said motor, a second switch in said reverse circuit, a third switch, normally open, in series with said second switch in said reverse circuit, a member mounted for movement in opposite directions, means connecting said motor to drive said member in one direction, upon energization of said forward circuit, to open said first switch and close said second switch, delayed-action means, energized upon closure of said second switch, to close said third switch after a predetermined interval, and means actuated by said member, upon movement thereof in the opposite direction to a predetermined degree, to open said second switch.

3. The combination with variable-speed drive means including an element shiftable oppositely to vary oppositely the output speed of said drive means, of control means therefor comprising a screw shaft mounted for opposite rotation, a nut threadedly mounted on said screw shaft and operatively connected to shift said shiftable element, a reversible electric motor connected to drive said shaft, a forward energizing circuit for said motor, a first on-off snap switch in said circuit, a reverse energizing circuit for said motor, a second on-off snap switch in said reverse circuit, said switches being so cooperatively associated that, while both may concurrently occupy "off" positions, neither can continue to occupy its "on" position when the other is moved to "on" position, a third switch, normally open, connected in said reverse circuit in series with said second switch, a member travelling with said nut, said member being effective, upon movement of said nut to a predetermined position by operation of said motor under the influence of said forward circuit, to shift said second switch to "on" position and said first switch to "off" position, delayed-action means dominated by said second switch and effective, a predetermined period after movement of said second switch to "on" position, to close said third switch, and means cooperative with said member, upon movement of said nut to a predetermined position by operation of said motor under the influence of said reverse circuit, to shift said second switch to "off" position.

4. In a control of the class described, a reversible electric motor, a forward energizing circuit for said motor, a first snap-action, push type on-off switch with double extensions connected in said circuit, a reverse energizing circuit for said motor, a second snap-action, push type on-off switch with double extensions connected in said reverse circuit, said switches being mounted with their push extensions so aligned and correlated that neither can continue to occupy its "on" position when the other is moved to "on" position, a third switch, normally open, connected in said reverse circuit in series with said second switch, delayed-action means dominated by said second switch and effective, a predetermined time after closure of said second switch, to close said third switch, a member mounted for movement in opposite directions, means connecting said motor, when energized by said forward circuit, to drive said member in one direction and, when energized by said reverse circuit, to drive said member in the opposite direction, and means shiftable by said member after movement in said one direction to a predetermined position, to shift said second switch to "on" position, and shiftable by said member, after movement in said opposite direction to a predetermined position, to open said second switch.

References Cited in the file of this patent

UNITED STATES PATENTS

| | | |
|---|---|---|
| 1,662,133 | Smith | Mar. 13, 1928 |
| 1,686,916 | Lewellen | Oct. 9, 1928 |
| 2,171,741 | Cohn et al. | Sept. 5, 1939 |
| 2,342,089 | Rosemann | Feb. 15, 1944 |
| 2,648,040 | Schneider | Aug. 4, 1953 |
| 2,682,781 | Lewellan et al. | July 6, 1954 |